(12) United States Patent
Veschi

(10) Patent No.: US 6,298,131 B1
(45) Date of Patent: Oct. 2, 2001

(54) AUTOMATIC SPEED DIAL UPDATING

(75) Inventor: John P. Veschi, Fogelsville, PA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/050,346

(22) Filed: Mar. 30, 1998

(51) Int. Cl.[7] .................................................. H04M 1/27
(52) U.S. Cl. .................. 379/355.06; 379/355.01
(58) Field of Search .................... 379/354–357, 379/100.14, 93.18, 93.23, 216, 355.01–355.06

(56) References Cited

U.S. PATENT DOCUMENTS

| | | | | |
|---|---|---|---|---|
| 4,908,853 | * | 3/1990 | Matsumoto | 379/354 |
| 4,933,968 | * | 6/1990 | Iggulden | 379/355 |
| 5,636,267 | * | 6/1997 | Utsumi et al. | 379/355 |
| 5,732,132 | * | 3/1998 | Hamada | 379/354 |
| 5,796,816 | * | 8/1998 | Utsumi | 379/355 |

FOREIGN PATENT DOCUMENTS 06-046172 * 2/1994 (JP) .

OTHER PUBLICATIONS

IBM Technical Disclosure Bulletin, vol. 37, No. 01, p. 391, "Method for Automatic Directoy Update upon Encounter of Specific Callee Message", Jan. 1994.*

* cited by examiner

Primary Examiner—Wing F. Chan
(74) Attorney, Agent, or Firm—J. P. Veschi

(57) ABSTRACT

A telephone according to the invention provides a memory adapted to hold a speed dial number, a calling mechanism adapted to place an outgoing call to the speed dial number based on user input, an input unit adapted to receive updating information, and a speed dial updating unit adapted to change the speed dial number in the memory according to the updating information. In an alternative embodiment, a method of updating a telephone number associated with a speed dial button includes the steps of receiving a signal relating to a change in the telephone number, and updating a memory location to reflect the change in the telephone number.

10 Claims, 3 Drawing Sheets

AUTOMATIC SPEED DIAL UPDATING

FIELD OF THE INVENTION

The invention is related to the field of telephony, and in particular to pre-programmed speed dial mechanisms.

BACKGROUND OF THE INVENTION

Most modern telephones include a speed dial feature. A typical speed dial feature is embodied in one or more speed dial buttons forming part of a telephone keypad. The purpose of the speed dial buttons is to make it easier for the owner of the phone to place outgoing calls to frequently called telephone numbers, such as to the numbers corresponding to friends and family. Typically, a telephone will have a plurality of speed dial buttons, each associated with a specific party to which the telephone owner may frequently place outgoing calls. Instead of pressing the sequence of buttons corresponding to an intended party's telephone number, the telephone owner simply activates the appropriate speed dial button. A processor within the telephone then associates the activated speed dial button with the desired telephone number, and creates a sequence of signals, such as dual tone multi-frequency (DTMF) signals, to mimic the sequence that would have been produced by the phone if the caller had pressed the sequence of buttons.

Instead of a series of speed dial buttons, an alternative speed dial feature includes a single speed dial or memory button that is activated in association with conventional numeric keys on a telephone keypad. According to this embodiment, for example, a user presses "memory" "1", by first pressing the "memory" key and then pressing the "1" key, in order to call the first speed dial number. Similarly, "memory" "2" causes the second speed dial number to be called. In each case, the telephone includes a memory, such as a random access memory, having a plurality of storage locations. Each memory location holds a unique telephone number that is associated with a speed dial button or sequence. When the speed dial feature is activated, a processor retrieves the number from the corresponding memory location and initiates a DTMF dialing sequence.

The speed dial feature is advantageous to many users because it allows them to place many outgoing calls by pressing a single button, instead of pressing a series of buttons. This advantage is becoming more significant as the telephone number density continues to grow to the point where even local telephone calls frequently require ten-number "dialing". In this context, of course, "dialing" typically refers to the activation of a button on a keypad, and not the rotary displacement of a dialing mechanism. Further, the speed dial feature relieves the telephone owner of the burden of remembering telephone numbers associated with the parties whose numbers are associated with the speed dial buttons.

Over time, however, a typical speed dial user may no longer remember a telephone number of a friend or family member. For example, a speed dial user may simply remember that to place a call to her mother she presses the first speed dial button, and to place a call to her brother she presses the second speed dial button, and have no recollection of the actual telephone number called when these speed dial buttons are pressed. Thus, if a speed dial button no longer functions, the user may be unable to immediately call the party associated with the speed dial button. For example, a speed dial button may become non-functioning if there is a change in the phone number of the party associated with the speed dial button. Such a change in phone number may occur, for example, when the party moves or when there is a change in the area code of the party associated with the speed dial button. There is a need, therefore, for a mechanism to automatically update speed dial buttons when a telephone number changes, such as when a party moves or when a party's area code changes.

SUMMARY OF THE INVENTION

A telephone according to the invention addresses this need by providing a memory adapted to hold a speed dial number, a calling mechanism adapted to place an outgoing call to the speed dial number based on user input, an input unit adapted to receive updating information, and a speed dial updating unit adapted to change the speed dial number in the memory according to the updating information.

In an alternative embodiment, a method of updating a telephone number associated with a speed dial button includes the steps of receiving a signal relating to a change in the telephone number, and updating a memory location to reflect the change in the telephone number.

BRIEF DESCRIPTION OF THE DRAWINGS

The invention may be better understood from the following detailed description when read with reference to the drawing in which.

DETAILED DESCRIPTION

Figure 1:
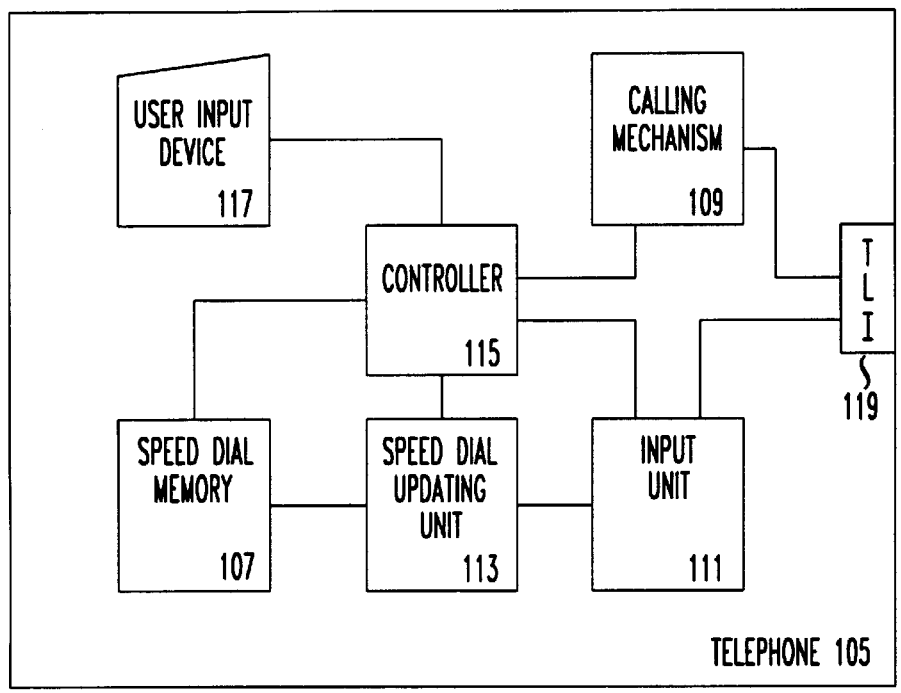
FIG. 1 is a simplified block diagram of one embodiment of a telephone according to the invention.

FIG. 1 provides a simplified block diagram of one embodiment of a telephone according to the invention. Telephone 105 includes a speed dial memory 107 adapted to hold a speed dial number, a calling mechanism 109 adapted to place an outgoing call to the speed dial number based on user input, an input unit 111 adapted to receive updating information, and a speed dial updating unit 113 adapted to change the speed dial number in the memory according to the updating information. Telephone 105 also includes a controller 115, a user input device 117, and a telephone line interface 119.

Figure 2:
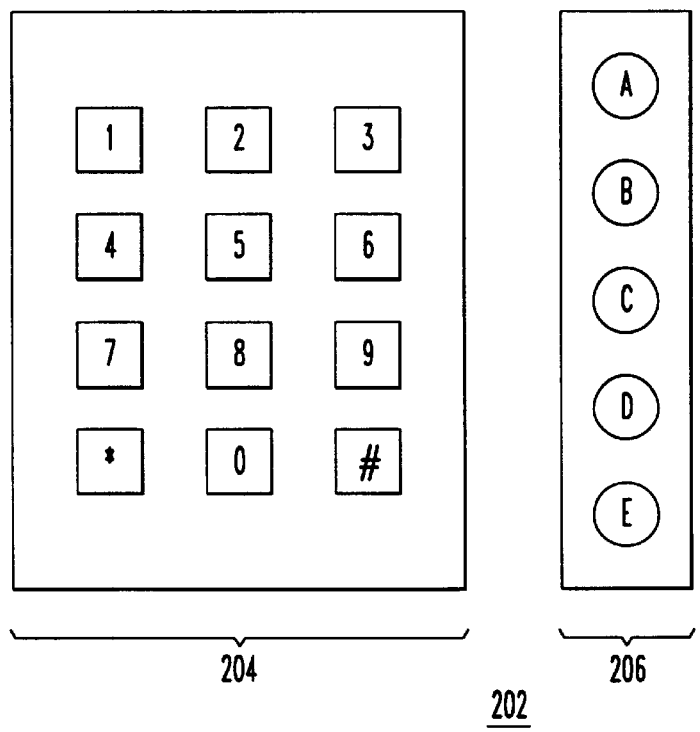
FIG. 2 shows a telephone keypad having a 12-key arrangement and a plurality of speed dial buttons.

User input device 117 may take the form of a keypad. For example, FIG. 2 shows keypad 202 having a conventional 12-key arrangement 204 and a plurality of speed dial buttons 206, shown here, for example, as five speed dial buttons A–F. A user of a telephone with keypad 202 may place an outgoing call by pressing the appropriate sequence of buttons on the 12-key arrangement 204. Further, for frequently dialed telephone numbers that have been pre-programmed into speed dial memory 107, the user may place an outgoing call to one of these numbers by pressing the appropriate speed dial button A–F. When controller 115 receives an indication that a speed dial button has been pressed, controller 115 retrieves a corresponding speed dial number from memory 107 and causes calling mechanism 109 to initiate an outgoing call to the speed dial number.

Figure 3:
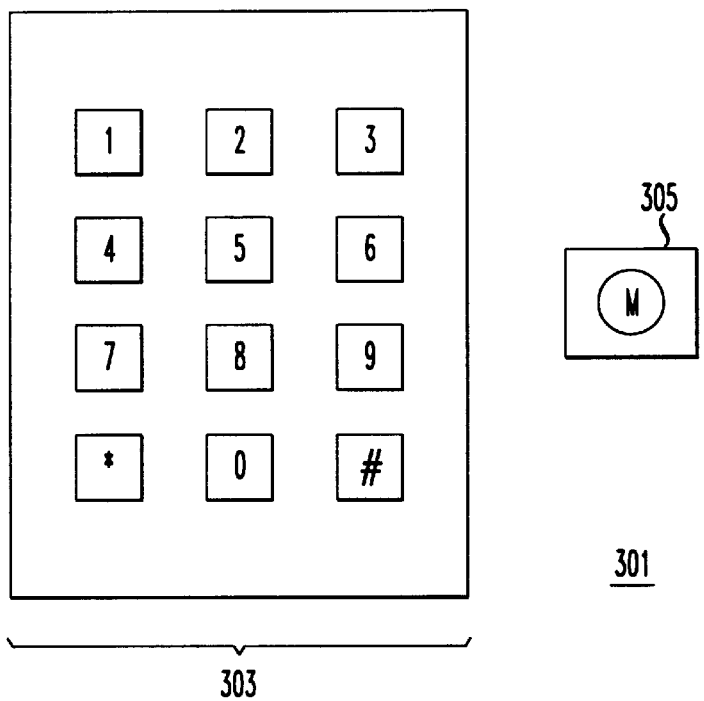
FIG. 3 shows an alternative user input device, including a 12-key arrangement and a memory button.

FIG. 3 shows an alternative user input device, wherein keypad 301 includes a 12-key arrangement 303 and a memory button 305. According to this arrangement, a user can also place outgoing calls by pressing the appropriate sequence of buttons on 12-key arrangement 303. A user may alternatively place an outgoing call to a number stored in speed dial memory 107 by pressing a sequence of buttons including the memory button 305 and at least one of the buttons of 12-key arrangement 303. For example, if the user wants to place an outgoing call to a first speed dial number, the user may press memory button 305 and then press the "1" button of the 12-key arrangement 303. Controller 115, in response to this input, will retrieve a first speed dial number from speed dial memory 107, and cause calling mechanism 109 to place an outgoing call to the first speed dial number.

Speed dial memory 107 is a read/writeable random access memory (RAM). The speed dial numbers stored in speed dial memory 107 are stored therein by way of any of three processes. A first storage process is for a user of telephone 105 to program the speed dial memory 107. For example, according to a programming routine, the user can press a specific sequence of buttons on user input device 107 to cause a telephone number to be stored in a particular location of memory 107 and thus become a speed dial number. Various procedures for accomplishing this programming are known and are explained in user's manuals accompanying conventional telephones with speed dial functionality. A second storage process is for a manufacturer of telephone 105 to store one or more numbers in speed dial memory 107 prior to sale of telephone 105 to the consumer (user). This process may be used, for example, to program "9-1-1" as an emergency speed dial number associated with a special-purpose speed dial button and stored in a write-protected memory location in speed dial memory 107.

A third method of programming speed dial memory 107 is for speed dial updating unit 113 to update or reprogram a speed dial number stored in speed dial memory 107 according to updating information received by input unit 111 from a service provider. For example, input unit 111 may receive the updating information from a central office of a public switched telephone network. The updating information may take the form of digital information, such as FSK data, or may take the form of a voice signal, such as a voice prompt.

The updating information in the form of a voice signal may comprise an automated voice prompt from the central office. Suppose, for example, that the party you are calling has moved, and thus the phone number of the party has changed. When a call is placed to the party's original telephone number, the central office may issue an automated voice prompt stating "the number for the party you are calling has changed to ABC–DEF–GHIJ, please make a note of it." It is understood, of course, that in this example the alphabetic characters A–J in fact are numeric and represent the party's new telephone number. In this case, the central office may or may not forward the call to the new telephone number, depending on the capabilities of the switch therein, the desires of the incoming caller, and/or whether the party moved locally, such that forwarding the call would not involve toll charges, or long distance, in which case toll charges would apply.

Regardless of whether the call is automatically forwarded to the new telephone number by the central office, input unit 111, in this embodiment, includes a voice recognition module that is adapted to receive the voice prompt from the central office and convert it to a format understandable by the speed dial updating unit 113. If the number originally called corresponds to one of the numbers stored in the speed dial memory 107, the speed dial updating unit 113, under the control of controller 115, will subsequently change the speed dial number in the speed dial memory 107 accordingly. For example, the speed dial updating unit will overwrite the memory location of the speed dial memory 107 with the new telephone number. As a result, if the user of telephone 105 subsequently presses a speed dial button corresponding to the memory location, the new telephone number will be dialed by calling mechanism 109.

In an alternative example, a target party may not move, but the telephone number of the target party may still change. This is especially true with respect to the area code portion of the target party's telephone number. Frequently, as the demand for telephone lines increases, telephone service providers are finding it necessary to establish new area codes, often by dividing an area previously covered by one area code into two or more regions each having its own area code. When this occurs, many telephone numbers will change only in the area code portion. For example, if the "123" area code region is divided into two regions, a first region retaining the "123" area code and a second region gaining a new "456" area code, a party in the new "456" region will have its telephone number change in area code only. Typically, there is an overlap period during which either area code, coupled with the party's local exchange and telephone number, will effectively contact the party. After this overlap period, only the new area code will work properly.

For example, if the party's original telephone number is "(123) 555-1212," and the party is in the geographic region to be assigned the "456" area code, during the overlap period a telephone call either to "(123) 555-1212," or to "(456) 555-1212" will connect to the target party. However, during the overlap period a call beginning with the old "123" area code will, during or proximate to the connection process, receive updating information, such as a voice prompt, stating "the area code of the party you are calling is changing to 4-5-6, please make a note of it." According to the invention, the input unit 111 will recognize this updating information and will, through the voice recognition module, convert it to the format understandable by the speed dial updating unit 113 for use in changing the appropriate memory location of the speed dial memory 107.

Figure 4:
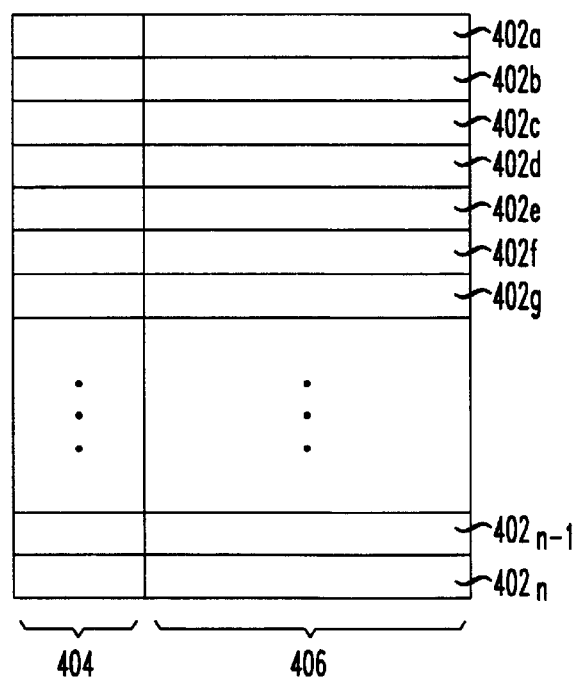
FIG. 4 shows an exemplary arrangement of a speed dial memory for use in a telephone according to the invention.

The speed dial memory 107 may be effectively organized as shown in FIG. 4, with a plurality of addressable memory cells 402, each adapted to store a speed dial number associated with a particular speed dial button 206, or associated with a button sequence including the memory button 305 and a button on 12-key arrangement 303. In one exemplary embodiment, memory 107 is further segmented into area code portion 404 and local number portion 406, such that each memory cell 402 includes a sub-cell from the area code portion 404 and a sub-cell from the local number portion 406. This arrangement is advantageous when the only portion of the speed dial number that changes is the area code, since speed dial updating unit 113 can leave the sub-cell from the local number portion 406 intact, and effect a change only in the sub-cell from the area code portion 404.

In each of the embodiments described above, the updating information is in the form of a voice prompt or other type of voice signal. Input unit 111 in these embodiments operates according to an algorithm adapted to analyze the voice communications during the telephone call process and identify when the appropriate voice prompts are present, so that input unit 111 does not erroneously act upon voice signals representing speech between the parties involved in an on-going telephone call. Preferably, the discrimination between on-going telephone call signals and voice prompt signals related to a changing telephone number is simplified by the transmission of the voice prompt signals only during an initial period, such as during a call set-up period. According to this embodiment, after the initial period, the input unit 111 will no longer monitor the call to identify updating information.

A further enhancement includes the provision of a unique alerting signal by the central office to alert the input unit 111 to the subsequent transmission of updating information. The alerting signal may take the form of a tone, such as a dual tone multi-frequency signal, or any other type of electrical signal, such as an inaudible electrical signal. According to this embodiment, input unit 111 can be configured to only monitor the call to identify updating information if the alerting signal is received. The advantage of this embodiment is that the alerting signal can be established as a signal that cannot be accidentally created during a voice conversation, thus providing additional safeguards to prevent accidental initiation of an updating process by input unit 111.

In an alternative embodiment, the updating information is not in the form of a voice signal, but is entirely constituted from digital and/or analog electrical signals, including, for example, FSK data, transmitted from the central office during an initial period, such as during a call set-up period, or transmitted as out-of-band information at any time during the call. According to this embodiment, input unit 111 is adapted to recognize the signals and input the information content contained therein for subsequent use by the speed dial updating unit 113 in updating speed dial memory 107.

User input device 117 may take the form of a keypad as shown in FIGS. 2 and 3. Alternatively, user input device 117 may take the form of a touch screen or any other device through which the user provides the controller 115 with an indication of a speed dial number the user wishes to dial. For example, user input device 117 may take the form of a voice recognition module coupled to a microphone within telephone 105 (not shown) through which the user can provide the speed dial input by either identifying the party to be called or by providing the telephone number of the party to be called. If the user input device is adapted to react merely to party identification, speed dial memory 107 will include, or be coupled to, a memory that associates the speed dial numbers with the names of the parties corresponding thereto.

Speed dial memory 107 may be configured as an integrated circuit memory, either within a single purpose memory chip, or as part of a multifunctional chip, such as an integrated circuit digital signal processor (DSP). Such a DSP may also include one or more of the calling mechanism 109, the input unit 111, the speed dial updating unit 113, the controller 115, and the user input device 117. Further, such a DSP may be adapted to also carry out conventional telephone functions in addition to those described herein. Of course, each of the above-described elements may be configured separately, for example, as part of separate integrated circuit devices.

Figure 5:
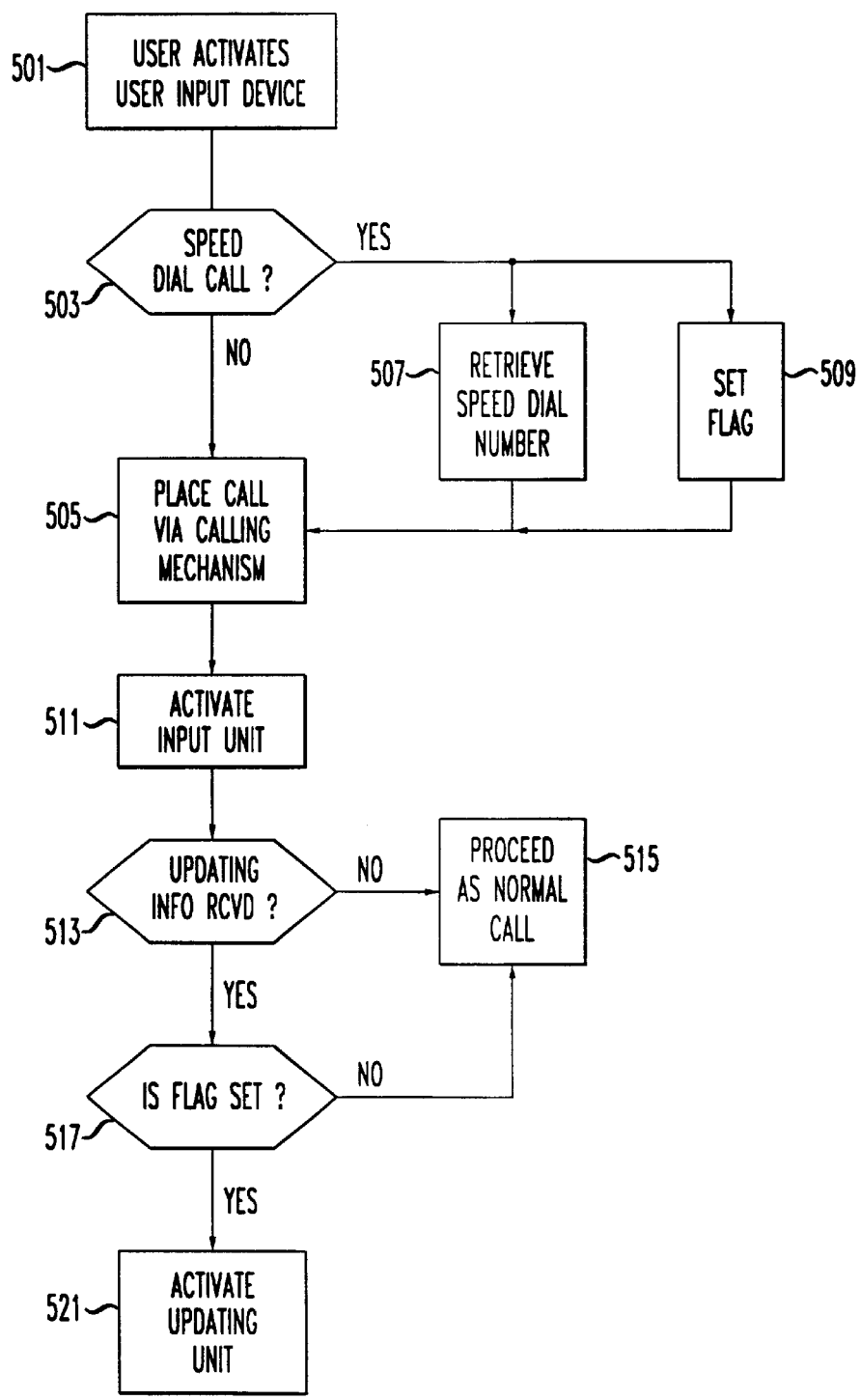
FIG. 5 is an exemplary flowchart of operation of a telephone according to the invention.

FIG. 5 provides a flowchart for operation of one embodiment of telephone 105 according to the invention. At step 501, a user of telephone 105 activates user input device 1 17 to initiate an outgoing call. Controller 1 15 responds to the user input device 117 by first determining if the user is initiating a speed dial call at step 503. If the call is not a speed dial call, meaning the user provided the calling information at step 501, then controller 115 proceeds to step 505 at which it places the outgoing call via calling mechanism 109. If, on the other hand, it is a speed dial call, controller 115 first retrieves the speed dial number from speed dial memory 107 at step 507 before proceeding with step 505 to place the outgoing call.

In one specific embodiment, if the decision at step 503 is YES, meaning the outgoing call is a speed dial call, controller 115 may also set a speed dial flag at step 509 in, for example, a DSP register, for future use, as will be explained below.

When the outgoing call is initiated, controller 115 also activates input unit 111 to monitor the call for updating information at step 511. If the updating information is not received, for example, during a predefined initial period, such as a call set-up period, as determined at step 513, then at step 515 the input unit is disabled and telephone 105 proceeds with the call as a normal call. If, on the other hand, the updating information is received, then input unit 111 can initiate an updating process.

Alternatively, prior to initiating the updating process, controller 115 and/or input unit 111 checks the flag set at step 509 in step 517. If the flag is not set, indicating that the outgoing call is not a speed dial call, then the updating process does not occur, and the controller returns to step 515 to handle the call as a normal call. If, on the other hand, the flag is set, indicating that the call is a speed dial call, then at step 521 the speed dial updating unit 113 is activated and provided the information necessary to update the speed dial memory 107 accordingly.

Thus, if the caller later places another outgoing call by, for example, activating the same speed dial button, the later call will be placed to the new telephone number instead of the old telephone number. As a result, once a user of telephone 105 programs the speed dial memory to include the telephone numbers of friends and family members, the user does not have to be bothered to reprogram the speed dial memory if, for example, the area codes of some of the user's friends and family members change.

It is understood that the above-described embodiments are merely illustrative of the invention, and that numerous other arrangements may be devised by those skilled in the art without departing from the spirit and scope of the invention. For example, instead of automatically updating the memory location, the user can be alerted to the new telephone number and can be afforded an opportunity to provide an authorization indication before the memory is updated. Also, instead of receiving the updating information during an initial period, such as a call setup period, the updating information may be received after completion of a voice communication portion of the call, or as part of a subsequent call.

What is claimed is:

1. A telephone, comprising:
   means for storing an area code and a local number of a speed dial number;
   means for placing an outgoing call to the speed dial number based on user input;
   means for receiving updating information;
   means for identifying that the updating information relates to a change in the area code of the speed dial number without a change in the local number of the speed dial number; and
   means for changing the area code of the speed dial number according to the updating information,
      wherein the means for receiving updating information includes means for receiving a voice signal indicating the change in the area code without the change in the local number, and means for providing an updating signal to the means for changing the speed dial number.

2. A method for updating a telephone number associated with a speed dial button, comprising the steps of:

receiving a signal relating to a change in the telephone number wherein the signal is a voice signal stating a new area code for the telephone number;

interpreting the voice signal to create a digital representation of the new area code of the telephone number;

identifying that the voice signal relates to a change in the area code of the telephone number without a change in a local number of the telephone number; and updating a memory location to reflect the change in the area code of the telephone number.

3. A method as recited in claim 1, wherein the voice signal is received during a period of time proximate to placing an outgoing call to the telephone number associated with the speed dial button.

4. The method as recited in claim 2, wherein the updating step further comprises leaving intact the local number of the telephone number.

5. A method as recited in claim 1, further comprising the steps of: alerting a user to the new telephone number; and waiting for an authorization indicator before completing the updating step.

6. In a telephone, including a memory having a plurality of memory locations, each memory location being adapted to hold an area code of a unique speed dial number in an area code portion sub-cell and to hold a local number of the unique speed dial number in a local number portion sub-cell, and the telephone also including a speed dial mechanism adapted to initiate outgoing calls to the speed dial numbers based on user input, a method of updating the memory locations, the method comprising the steps of:

receiving a voice signal relating to a change in one of the speed dial numbers;

identifying that the voice signal relates to a change in an area code of the speed dial number without a change in a local number of the speed dial number;

interpreting the voice signal to create a digital representation of a new area code for the speed dial number; and updating the area code portion sub-cell of the memory location holding the speed dial number without updating the local number portion sub-cell of this memory location.

7. A method as recited in claim 6, further comprising the steps of:

alerting a user to the new speed dial number; and waiting for an authorization indicator before completing the updating step.

8. A method as recited in claim 6, wherein the voice signal is received during a period of time proximate to placing an outgoing call to the speed dial number.

9. A telephone, comprising:

a memory adapted to hold an area code and a local number of a speed dial number;

a calling mechanism adapted to place an outgoing call to the speed dial number based on user input;

an input unit adapted to received updating information and to identify that the updating information relates to a change in the area code of the speed dial number without a change in the local number of the speed dial number; and a speed dial updating unit adapted to change the area code of the speed dial number in the memory according to the updating information;

wherein the input unit comprises a voice recognition module adapted to receive, as the updating information, a voice signal indicating the change in the area code without the change in the local number, and to provide an updating signal to the speed dial updating unit.

10. The telephone as recited in claim 9, wherein:

the memory has a plurality of memory locations, each memory location being adapted to hold the area code of the speed dial number in an area code portion sub-cell and to hold the local number of the speed dial number in a local number portion sub-cell; and the speed dial updating unit is adapted to change the area code portion sub-cell of the memory location holding the speed dial number without updating the local number portion sub-cell of this memory location.

* * * * *